(12) United States Patent
Alacoque et al.

(10) Patent No.: US 6,498,969 B2
(45) Date of Patent: Dec. 24, 2002

(54) METHOD AND A SYSTEM FOR LOCATING A VEHICLE ON A TRACK

(75) Inventors: Jean-Claude Alacoque, Communay (FR); Mazen Alamir, St Martin d'Heres (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/983,675

(22) Filed: Oct. 25, 2001

(65) Prior Publication Data

US 2002/0109049 A1 Aug. 15, 2002

(30) Foreign Application Priority Data

Dec. 4, 2000 (FR) .............................. 00 15696

(51) Int. Cl.⁷ ............................................... B61L 23/00
(52) U.S. Cl. ...................................... 701/19; 246/122 R
(58) Field of Search ............................ 701/19, 20, 214; 246/122 R

(56) References Cited

U.S. PATENT DOCUMENTS

| | | | | |
|---|---|---|---|---|
| 3,954,064 A | * | 5/1976 | Minovitch | 104/130.02 |
| 4,148,260 A | * | 4/1979 | Minovitch | 104/138.1 |
| 4,573,131 A | * | 2/1986 | Corbin | 33/1 Q |
| 5,893,043 A | * | 4/1999 | Moehlenbrink et al. | 246/182 C |
| 5,986,547 A | * | 11/1999 | Korver et al. | 246/121 |
| 6,278,914 B1 | * | 8/2001 | Gaudreau et al. | 105/199.2 |

FOREIGN PATENT DOCUMENTS

| | | |
|---|---|---|
| EP | 0 605 848 | 7/1994 |
| EP | 0 795 454 | 9/1997 |
| FR | 2 632 411 | 12/1989 |

\* cited by examiner

Primary Examiner—William A. Cuchlinski, Jr.
Assistant Examiner—Olga Hernandez
(74) Attorney, Agent, or Firm—Sughrue Mion, PLLC

(57) ABSTRACT

A method of locating a rail vehicle on a rail track includes the following steps:

measuring the speed of the vehicle at different times using means providing an approximate value of the actual speed of the vehicle;

measuring an inertial magnitude at different times using a single inertial sensor disposed on board the vehicle, the inertial magnitude being chosen to depend only on the speed of the vehicle and a geometrical characteristic specific to the track;

calculating the abscissa of the vehicle on the track by means of a convergent algorithm based on a non-linear observer, from the known values of the measured approximate speed of the vehicle at different times preceding the time at which the vehicle is to be located, the measurements of the inertial magnitude and a database in which the geometrical characteristics specific to the track and its spatial derivative are stored for different curvilinear abscissae, the database being obtained by a learning process conducted beforehand.

18 Claims, 2 Drawing Sheets

METHOD AND A SYSTEM FOR LOCATING A VEHICLE ON A TRACK

BACKGROUND OF THE INVENTION

1. Field of the Invention

The present invention relates to a method of locating a vehicle on a track, and especially a rail vehicle on a rail track, enabling great accuracy to be obtained as to the position of the vehicle from an approximate measurement of the speed of the vehicle and a single inertial magnitude measured on board the vehicle.

The invention also relates to a location system implementing the method and which can be used in particular to control controlled systems intended to improve the comfort of passengers.

2. Description of the Prior Art

The simplest technique routinely employed for locating a rail vehicle on a rail track is to measure the distance traveled on the track from a starting point by integrating the speed of the vehicle. However, the speed of the vehicle is usually measured by measuring the rotation speed of the axles. The diameter of the wheels decreases as they wear down and the wheels skid when there is a high drive torque and low adhesion. Thus integrating the speed can lead to high errors between the measured position and the actual position of the vehicle after a few tens of kilometers.

Another prior art technique for locating a vehicle consists of equipping the rail tracks with beacons for precisely locating the rail vehicle on the track on which it is traveling. However, this technique has the disadvantage of making it necessary to install beacons along all the rail tracks of a rail network and its cost is therefore prohibitive. The technique consisting of locating a vehicle by means of the GPS system has the disadvantage of not enabling the vehicle to be located in shadow areas such as tunnels.

French patent application FR-99 07 435 filed by the applicant remedies the above disadvantages by locating a rail vehicle on a rail track by correlating a track profile calculated from the output of a plurality of inertial sensors disposed on board the vehicle with a map of the rail track stored during a previous journey. However, this kind of location technique requires the presence of a plurality of inertial sensors, which has the disadvantage that the sensors increase the cost of the rail vehicle. What is more, this kind of location method does not necessarily guarantee continuous location because it is based on searching a database for a correlation between measured values and a stored track profile.

The object of the invention is to alleviate the above disadvantages by proposing a method that allows accurate location of a vehicle on a track, by continuous convergence, without requiring additional trackside equipment, and using only one inertial sensor, so that it is simple and economical to implement.

SUMMARY OF THE INVENTION

The invention therefore provides a method of locating a rail vehicle on a rail track which includes the following steps:

measuring the speed of the vehicle at different times using means providing an approximate value of the actual speed of the vehicle;

measuring an inertial magnitude at different times using a single inertial sensor disposed on board the vehicle, the inertial magnitude being chosen to depend only on the speed of the vehicle and a geometrical characteristic specific to the track, such as the cant or the radius of curvature;

calculating the abscissa of the vehicle on the track by means of a convergent algorithm based on a non-linear observer, from known values of the measured approximate speed of the vehicle at different times preceding the time at which the vehicle is to be located, the measurements of the inertial magnitude and a database in which the geometrical characteristics specific to the track and its spatial derivative are stored for different curvilinear abscissae, the database being obtained by a learning process conducted beforehand.

According to another feature of the invention:

the speed Vm of the vehicle is measured at constant time intervals $DT_o$, the measurements of the speed $Vm(t_i)$ being effected at times $t_i$, $i \in [1,N]$ of an observation time window $T_o$ preceding the measurement time $t_N$ at which the vehicle is to be located and being stored in a memory;

the measurements of the inertial magnitude $y(t_i)$ effected on board the vehicle for the different times $t_i$ are stored in a memory;

an estimated curvilinear abscissa $\tilde{S}N$ of the vehicle at the time $t_N$ is calculated by successive iteration, each new measurement time $t_N$ generating a new calculation iteration for which the observation window $T_o$ is shifted by an amount $DT_o$ so that the starting point $i=0$ of the new observation window $T_o$ coincides with the abscissa of the measurement point $i=1$ of the observation window $T_o$ of the preceding iteration, the estimated curvilinear abscissa $\tilde{S}N$ being calculated using the equation:

$$\tilde{s}_N = \hat{s}_0 + \sum_{i=1}^{i=N} \tilde{V}_i * DT_o, \text{ with } \tilde{V}_i = (1 + e(\hat{s}_0)) * Vm(t_i)$$

in which $\tilde{V}i$ is the corrected speed of the vehicle at each time $t_i$ of the observation window $T_o$, $e(\hat{s}o)$ is the relative speed error and so is the corrected curvilinear abscissa of the starting point of the observation window $T_o$, $e(\hat{s}o)$ and so being obtained in the preceding iteration by a convergent algorithm based on a non-linear observer from measurements of the speed $Vm(t_i)$, the single inertial magnitude $y(t_i)$ at each time $t_i$ and the geometrical characteristic $RO(\tilde{S}i)$ and its spatial derivative $DRO(\tilde{S}i)$ at the level of the curvilinear abscissa $\tilde{S}i$ estimated using the equation $$\tilde{s}_i = \hat{s}_0 + \sum_{n=1}^{i} \tilde{V}_n * DT_o.$$

The method according to the invention can further include one or more of the following features, individually or in any technically feasible combination the database contains triplets $(S_j, RO_j, DRO_j)$ obtained by measuring the inertial magnitude $y(_sj)$ at different abscissae $s_j$ during a previous journey of a vehicle along the track under operating conditions guaranteeing a precise knowledge of the data of the triplets;

for any estimated abscissa $\tilde{S}i$ of the track the values of the geometrical characteristic $RO(\tilde{S}i)$ and the spatial derivative $DRO(\tilde{S}i)$ are calculated by interpolation between two triplets $(S_j, RO_j, DRO_j)$ stored in the database;

the inertial sensor is a yaw rate gyro;

the inertial sensor is a roll rate gyro;

the vehicle is a rail vehicle travelling along a rail track;

the method of locating a vehicle on a track is used to control controlled systems of a rail vehicle which have to be controlled in phase with the geometry of the track, such as a tilt system or an active transverse suspension system, recorded passenger announcements or a speed profile imposed on the vehicle.

The invention also provides a system for locating a vehicle on a track employing the above method and which includes:

measuring means providing the approximate speed of the vehicle;

a single inertial sensor;

a database in which a geometrical characteristic specific to the track and its spatial derivative for different curvilinear abscissae of the track are stored; and a computer receiving the information from the speed measuring means and from the sensor, the computer being connected to the database to calculate the abscissa of the vehicle on the track.

Other features and advantages will emerge from the following description of one embodiment of a location method according to the invention, which description is given by way of example only and with reference to the accompanying drawings.

DETAILED DESCRIPTION OF THE PREFERRED EMBODIMENTS

Figure 1:
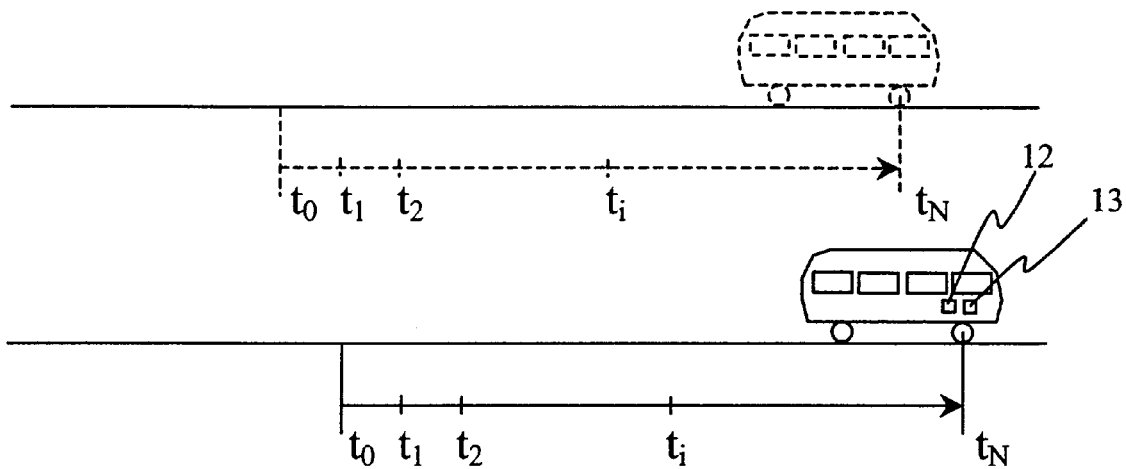
FIG. 1 is a diagram showing the principle of an observation time window used in one particular embodiment of a location method according to the invention.

FIG. 1 shows a rail vehicle traveling on a rail track, the rail vehicle incorporating an inertial sensor 12 which is advantageously a yaw rate gyro, and means 13 for measuring the approximate actual speed of the vehicle, of the kind usually provided on board a rail vehicle and using a method based on the rotation speed of the axles. In a variant of the location method, the inertial sensor 12 is a roll rate gyro or a transverse acceleration sensor.

Figure 2:
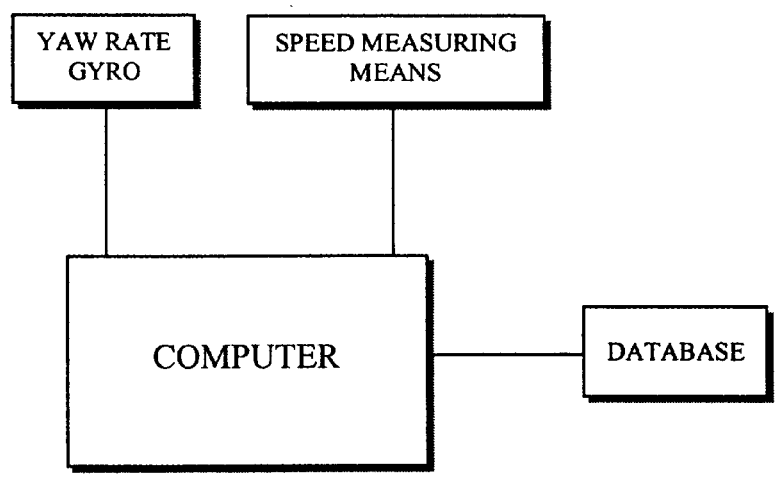
FIG. 2 is a block diagram showing the structure of a location system according to the invention.

FIG. 2 is a block diagram of a system for locating a rail vehicle enabling a vehicle to be located accurately on a rail track. As can be seen in FIG. 2, the location system includes a computer 14 which is connected to the yaw rate gyro 12 and to the means 13 for measuring the approximate speed of the vehicle. The computer 14 is associated with a database 16 in which a geometrical characteristic $RO_j$ specific to the track and its spatial derivative $DRO_j$ for different abscissa $S_j$ of the track are stored in the form of triplets $(s_j, RO_j, DRO_j)$. The geometrical characteristic stored in the database 16 depends on the inertial sensor 12 used and must enable a theoretical value of the inertial measurement supplied by the sensor 12 to be calculated, in conjunction with the speed of the vehicle.

Accordingly, if the inertial sensor 12 is a yaw rate gyro, the characteristic RO contained in the database 16 is the curvature of the track. The curvature $\rho(s)$ of a rail track varies only very slowly as a function of the abscissa s within a curve and the measured value y(t) supplied by a yaw rate gyro can therefore be written $y(t) \approx \rho(s).V(s)$ where $\rho(s)$ is the curvature of the track at the abscissa s and V(s) is the speed of the vehicle.

If the inertial sensor 12 is a roll rate gyro, the characteristic RO contained in the database 16 is the cant D(s) of the track. The cant is generally small compared to the distance L between the rails, and the measurement y(t) supplied by the roll rate gyro can be written:

$$y(t) \approx \frac{1}{L} \cdot \frac{dD(s)}{ds} \cdot V(s)$$

The triplets $(RO_j, DRO_j, S_j)$ in the database 16 are obtained by a learning process entailing a rail vehicle travelling over the rail tracks and measuring the inertial value by means of the inertial measurement means 12 for different abscissae $s_j$ obtained by integrating the speed of the vehicle. Of course, during this journey of the vehicle for instructing the database 16, the speed-measuring means 13 are calibrated and the traveling conditions are chosen so that there is no slip between the wheels and the rails, so that the measured speed and therefore the abscissae of the track obtained are accurate. The geometrical characteristic of the track and the cant are calculated off-line, by inverse application of one of the previous equations, and then by differentiating with respect to the abscissa.

Figure 3:
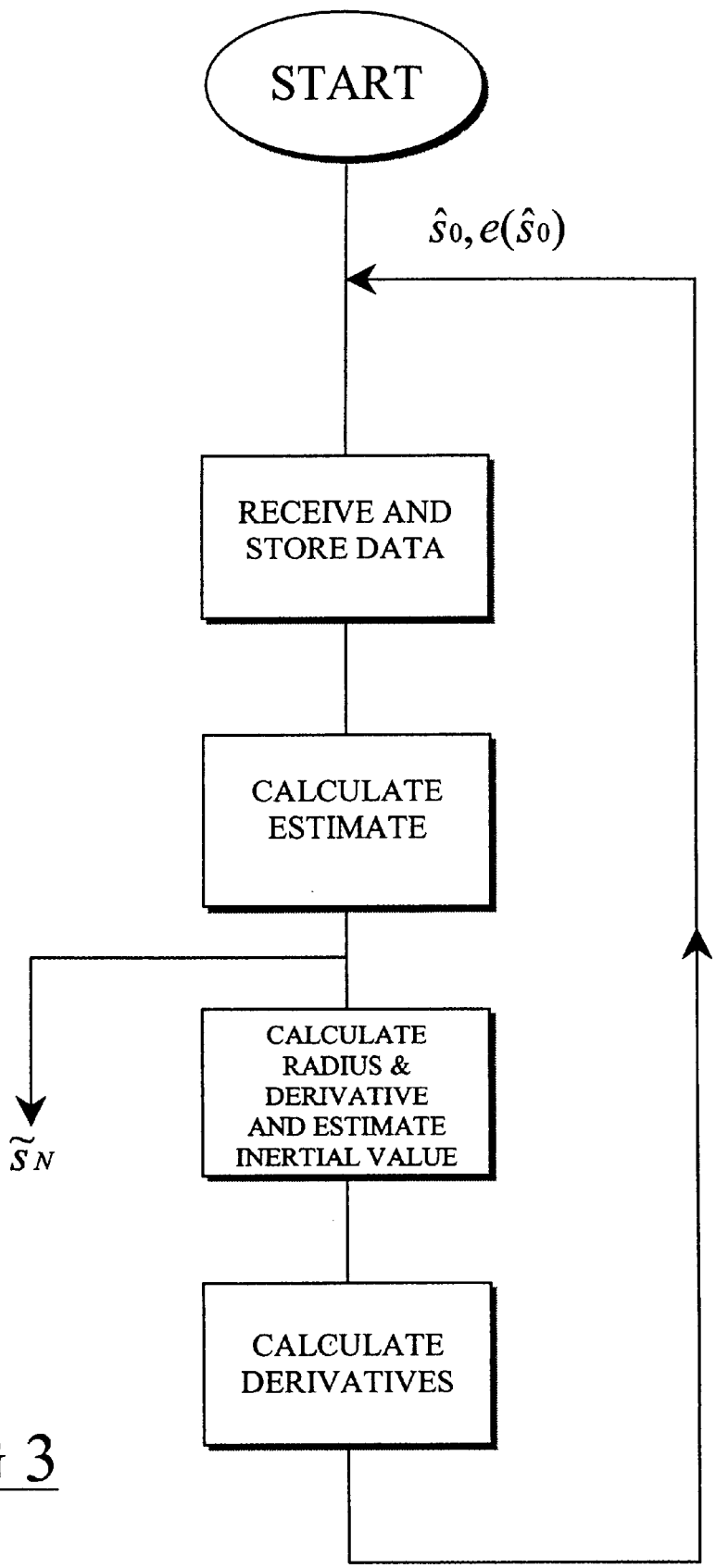
FIG. 3 is a flowchart showing the main steps of a location method according to the invention.

As described next with reference to FIG. 3, which is a flowchart showing the general functioning of the location system, the computer 14 successively iterates a series of calculation steps based on values measured by the yaw rate gyro 12 and the speed measuring means 13 in an observation time window of width To shown in FIG. 1.

As described next with reference to FIG. 3, which is a flowchart showing the general functioning of the location system, the computer 14 iterates a series of calculation steps in an observation time window of width $T_o$ in which the values $y(t_i)$ produced by the yaw rate gyro 12 and the values $Vm(t_i)$ produced by the speed measuring means 13 are stored at different times $t_i$, $i \in [1,N]$, corresponding to a curvilinear abscissa $\hat{S}i$ of the vehicle, the various times $t_i$ being separated by a fixed period $DT_o$. As in FIG. 1, in which the preceding iteration observation window $T_o$ is shown in dashed line, the observation window $T_o$ is shifted by the time interval $DT_o$ on each new iteration so that the new abscissa $\hat{S}0$, corresponding to the starting point of the new observation window, corresponds to the abscissa $\hat{S}1$ of the observation window used in the preceding iteration.

To simplify the calculations, it is assumed in the particular embodiment of the location method described hereinafter that the speed varies slowly and therefore that the derivative $\dot{e}(\hat{S}0)$ of the relative error on the measured speed is zero over the observation time $T_o$. The series of calculation steps performed by the computer 14 on each iteration, i.e. each time that the observation window is shifted in time by $DT_o$, is described hereinafter. The last point $t_N$ corresponds to the last measurement point.

In a first step 18 the computer 14 receives and stores in its memory the Nth value $Y(t_N)$ from the yaw rate gyro 12 and the Nth value $Vm(t_N)$ from the speed measuring means 13 and added in the memory to the measurements obtained at the various times $t_i$ situated in the observation time window of width $T_o$ preceding the current time $t_N$ at which the vehicle is to be located.

During the first step 18, the computer 14 also receives the observed curvilinear abscissa $\hat{S}0$ and the relative speed error $e(\hat{S}0)$ calculated by the computer 14 during the preceding iteration. The abscissa $\hat{S}0$ corresponds to the starting point of the new observation window. To start the calculation process it is assumed for the first calculation iteration, for which there is no preceding iteration, that the starting curvilinear abscissa $\hat{S}0$ is known approximately and that $e(\hat{S}0)$ is zero, for example.

From the above data, the computer 14 calculates the corrected speed $\tilde{V}(t_i)$ for each time $t_i$ in the observation window $T_o$ from the equation:

$$\tilde{V}(ti) = (1 + e(\hat{S}0)) \cdot V_m(ti)$$

In the next step 20 the computer 14 calculates an estimate $\tilde{S}i$ of each curvilinear abscissa by time integration of the corrected speed $\tilde{V}(ti)$ in the observation window $T_o$, in other words:

$$\tilde{s}_i = \hat{s}_0 + \sum_{n=1}^{i} \tilde{V}(t_n) \cdot DT_o$$

At the end of step 20, for i=N, the estimated position of the vehicle at the current time $t_N$ is known from the equation:

$$\tilde{s}_N = \hat{s}_0 + \sum_{i=1}^{N} \tilde{V}(t_i) \cdot DT_o,$$

that abscissa corresponding to the corrected position of the rail vehicle on the rail track obtained by the location method.

The subsequent calculation steps calculate the corrected abscissa $\hat{S}1$ of the point 1 of the observation window $T_o$ and the relative speed error $e(\hat{S}1)$ observed at the same point 1, the values $\hat{S}1$ and $e(\hat{S}1)$ serving respectively as reference data $\hat{S}0$ and $e(\hat{S}0)$ for calculating the corrected position of the vehicle on the next calculation iteration.

In step 22, the computer 14 initially calculates the values of the radius of curvature $RO(\tilde{S}i)$ and its spatial derivative $DRO(\tilde{S}i)$ for each estimated curvilinear abscissa $\tilde{S}i$. The values $RO(\tilde{S}i)$ and $DRO(\tilde{S}i)$ are calculated by linear interpolation between two adjacent triplets $(RO_j, DRO_j, s_j)$ extracted from the database 16.

In the same step 22 the inertial measurement $\tilde{y}(\tilde{S}i)$ at each estimated curvilinear abscissa $\tilde{S}i$ is estimated using the equation $\tilde{y}(\tilde{S}i) = RO(\tilde{S}i) \cdot \tilde{V}(t_i)$ In the next step 24 the computer 14 calculates the derivative of the observed abscissa $\dot{S}(\hat{S}1)$ and the derivative of the relative speed error $\dot{e}(\hat{S}1)$ for the speed measured at the point 1 in the observation window $T_o$ using the sliding horizon state observer method, the theory of which is described in a paper by Mazen ALAMIR published in 1999 in the journal "International Journal of Control", volume 72, N° 13, pages 1204 to 1217.

The values $\dot{S}(\hat{S}1)$ and $\dot{e}(\hat{S}1)$ are calculated from the following equations, obtained by applying the mathematical method defined above to the location of the rail vehicle:

$$\begin{vmatrix} \dot{s}(\hat{s}_1) \\ \dot{e}(\hat{s}_1) \end{vmatrix} = \begin{vmatrix} (1 + e(\hat{s}_0)) \cdot V_m(t_1) \\ 0 \end{vmatrix} - k \cdot G^T \cdot (G \cdot G^T + \alpha)^{-1} \cdot \sqrt{J}$$

where $G = |G_1 \; G_2|$ where $$G_1 = \sum_{i=1}^{N} X_{1i} \cdot DT_o, \; G_2 = \sum_{i=1}^{N} (X_{1i} \cdot V_m(t_i) + X_{2i}) \cdot DT_o$$

and $$J = \sum_{i=1}^{N} \left( \tilde{V}(t_i) \cdot RO(\tilde{s}_i) - y(t_i) \right)^2 \cdot DT_o$$

The intermediate variables X1i and X2i are determined from the following equations:

$$X_{1i} = 2 \cdot (RO(\tilde{s}i) \cdot \tilde{V}(ti) - y(ti)) \cdot \tilde{V}(ti) \cdot DRO(\tilde{s}i),$$

$$X_{2i} = 2 \cdot (RO(\tilde{s}i) \cdot \tilde{V}(ti) - y(ti)) \cdot Vm(ti) \cdot RO(\tilde{s}i)$$

In the above equations, k and $\alpha$ are parameters. For example $$k = \frac{0.2}{\sqrt{DT_o}}$$

to guarantee that the observer makes an estimate with a minimum error and $\alpha=1$ to guarantee stability in a straight line.

Calculating $\dot{S}(\hat{S}1)$ and $\dot{e}(\hat{S}1)$ then yields, by time integration, the corrected value $\hat{S}1$ and the value $e(\hat{S}1)$ respectively corresponding to the corrected abscissa and the relative speed error for the speed at point 1 in the observation window $T_o$.

The values $\hat{S}1$ and $e(\hat{S}1)$ obtained in step 24 are then fed back to the input of the first calculation step 18 so that they can be used during the next calculation iteration, the values $\hat{S}1$ and $e(\hat{s}1)$ obtained in this way corresponding to the values of $\hat{S}0$ and $e(\hat{S}0)$ used in the new calculation iteration, for which the observation window $T_o$ is shifted so that the starting point i=0 of the new observation window corresponds to the point i=1 of the preceding observation window.

The above kind of location method has the advantage of locating the rail vehicle accurately at each measurement time $t_N$.

The location method according to the invention can advantageously be used to control controlled systems of a rail vehicle which need to be controlled in phase with the geometry of the rail track, such as a tilt system or an active transverse suspension system, or speed profiles imposed on the vehicle.

The invention that has just been described has the advantage of being economical to implement, requiring only one inertial sensor on board the vehicle, the approximate speed of the vehicle and a database containing a geometrical characteristic specific to the track.

Of course, the invention is in no way limited to the example previously described, which assumes that the speed varies slowly and therefore that the derivative of the relative error on the speed is zero over the time window $T_o$ in order to simplify the calculations. To the contrary, the location method can more generally use the sliding horizon state observer theory and take account of faster variations in the speed by using the following equations:

$$\begin{vmatrix} \dot{s} \\ \dot{e} \\ \dot{f} \\ \vdots \\ \dot{j} \end{vmatrix} = \begin{vmatrix} (1+e)\cdot Vm \\ f \\ g \\ \vdots \\ \|RO\cdot\hat{s} - y\|^2 \end{vmatrix} - k\cdot G^T \cdot (G\cdot G^T + \alpha)^{-1} \cdot \sqrt{J}$$

in which $\dot{e}, \dot{f}, \dot{g} \ldots$ represent the successive derivatives of the relative speed error e, with $f=\dot{e}, g=\dot{f}$, and so on.

In the above equations, k and $\alpha$ are variable parameters and G is the gradient of the criterion J as a function of the state of the system, which is given by the solution A of the following differential matrix equation:

$$\dot{A} = \begin{vmatrix} 0 & Vm & 0 & 0 & \cdot & 0 \\ 0 & 0 & 1 & 0 & \cdot & 0 \\ 0 & 0 & 0 & 1 & \cdot & 0 \\ \cdot & \cdot & \cdot & \cdot & \cdot & \cdot \\ \chi_1 & \chi_2 & 0 & 0 & 0 & 0 \end{vmatrix} \cdot A \text{ and } A(0) = \begin{vmatrix} 1 & 0 & 0 & 0 & \cdot & 0 \\ 0 & 1 & 0 & 0 & \cdot & 0 \\ 0 & 0 & 1 & 0 & \cdot & 0 \\ \cdot & \cdot & \cdot & \cdot & \cdot & \cdot \\ 0 & 0 & 0 & 0 & \cdot & 1 \end{vmatrix}$$

where $$\chi_1 = \frac{\delta j}{\delta s} = 2\cdot(RO\cdot\hat{s} - y)\cdot\hat{s}\cdot DRO$$

$$\chi_2 = \frac{\delta j}{\delta e} = 2\cdot(RO\cdot\hat{s} - y)\cdot V_m\cdot RO$$

Accordingly, taking the case of a zero order observer, i.e. taking $\dot{e}=0$ in the observation window $T_o$, the equations employed in the particular embodiment previously described are obtained, namely:

$$G^T = \int_0^{T_o} \begin{vmatrix} \chi_1 \\ \chi_1 \cdot V_m + \chi_2 \end{vmatrix} \cdot dt$$

In the case of a second order observer, i.e. for $\dot{g}=0$ in the observation window $T_o$ the following equation is then obtained:

$$G^T = \int_0^{T_o} \begin{vmatrix} \chi_1 \\ \chi_1\cdot V_m + \chi_2 \\ \chi_1\cdot\int_0^t (V_m(\tau)\cdot\tau\cdot d\tau) + \chi_2\cdot t \\ \frac{1}{2}\cdot\chi_1\cdot\int_0^t (V_m(\tau)\cdot\tau^2\cdot d\tau) + \frac{1}{2}\cdot\chi_2\cdot t^2 \end{vmatrix} \cdot dt$$

There is claimed:

1. A method of locating a rail vehicle on a rail track which includes the following steps:
   measuring the speed of said vehicle at different times using means providing an approximate value of the actual speed of said vehicle;
   measuring an inertial magnitude at different times using a single inertial sensor disposed on board said vehicle, said inertial magnitude being chosen to depend only on said speed of said vehicle and a geometrical characteristic specific to said track;
   calculating an abscissa of said vehicle on said track by means of a convergent algorithm based on a non-linear observer, from known values of the measured approximate speed of said vehicle at different times preceding the time at which said vehicle is to be located, said measurements of said inertial magnitude and a database in which said geometrical characteristics specific to said track and the spatial derivative of each said geometrical characteristic are stored for different curvilinear abscissae, said database being obtained by a learning process conducted beforehand.

2. The method claimed in claim 1 of locating a rail vehicle on a rail track, wherein $\tilde{S}i$ represents a curvilinear abscissa of said vehicle at time $t_i$ and:
   said speed Vm of said vehicle is measured at constant time intervals $DT_o$, said measurements of said speed $Vm(t_i)$ being effected at times $t_i$, $i\in[1,N]$ of an observation time window $T_o$ preceding the measurement time $t_N$ at which said vehicle is to be located and being stored in a memory;
   said measurements of said inertial magnitude $y(t_i)$ effected on board said vehicle for said different times $t_i$ are stored in a memory; and an estimated curvilinear abscissa $\tilde{S}N$ of said vehicle at the time $t_N$ is calculated by successive iteration, each new measurement time $t_N$ generating a new calculation iteration for which said observation window $T_o$ is shifted by an amount $DT_o$ so that the starting point i=0 of the new observation window $T_o$ coincides with the abscissa of the measurement point i=1 of said observation window $T_o$ of the preceding iteration, said estimated curvilinear abscissa $\tilde{S}N$ being calculated using the equation:

$$\tilde{s}_N = \hat{s}_0 + \sum_{i=1}^{i=N} \tilde{V}_i * DT_o, \text{ with } \tilde{V}_i = (1 + e(\hat{s}_0)) * Vm(t_i)$$

in which $\tilde{V}i$ is the corrected speed of said vehicle at each time $t_i$ of said observation window $T_o$, $e(\hat{S}0)$ is the relative speed error and $\hat{S}0$ is the corrected curvilinear abscissa of the starting point of said observation window $T_o$, $e(\hat{S}0)$ and $\hat{S}0$ being obtained in the preceding iteration by a convergent algorithm based on a non-linear observer from measurements of said speed $Vm(t_i)$, said single inertial magnitude $y(t_i)$ at each time $t_i$ and said geometrical characteristic $RO(\tilde{S}i)$ and its spatial derivative $DRO(\tilde{S}i)$ at the level of the curvilinear abscissa $\tilde{S}i$ estimated using the equation $$\tilde{s}_i = \hat{s}_0 + \sum_{n=1}^{i} \tilde{V}_n * DT_o.$$

3. The method claimed in claim 1 of locating a vehicle on a track, wherein said database contains triplets obtained by measuring said inertial magnitude $y(t_j)$ at different abscissae $S_j$ during a previous journey of a vehicle along said track under operating conditions guaranteeing a precise knowledge of the data of said triplets.

4. The method claimed in claim 3 of locating a vehicle on a track, wherein for any estimated abscissa $\tilde{S}i$ of said track said values of said geometrical characteristic $RO(\tilde{S}i)$ and said spatial derivative $DRO(\tilde{S}i)$ are calculated by interpolation between two triplets stored in said database.

5. The method claimed in claim 1 of locating a vehicle on a track, wherein said inertial sensor is a yaw rate gyro.

6. The method claimed in claim 1 of locating a vehicle on a track, wherein said inertial sensor is a roll rate gyro.

7. The method claimed in claim 2 of locating a vehicle, wherein said relative measured speed error e($\hat{S}1$) and said corrected abscissa $\hat{S}1$ are calculated in each observation window $T_o$ from the following sliding horizon state observer equations:

$$\begin{vmatrix} \dot{s} \\ \dot{e} \\ \dot{f} \\ \vdots \\ \dot{j} \end{vmatrix} = \begin{vmatrix} (1+e) \cdot Vm \\ f \\ g \\ \vdots \\ \|RO \cdot \dot{s} - y\|^2 \end{vmatrix} - k \cdot G^T \cdot (G \cdot G^T + \alpha)^{-1} \cdot \sqrt{J}$$

in which $\dot{e}, \dot{f}, \dot{g} \ldots$ represent the successive derivatives of said relative speed error e, k and $\alpha$ are parameters, and G is the gradient of the criterion J as a function of the state of said system which is given by the solution A of the following differential matrix equation:

$$\dot{A} = \begin{vmatrix} 0 & Vm & 0 & 0 & \cdot & 0 \\ 0 & 0 & 1 & 0 & \cdot & 0 \\ 0 & 0 & 0 & 1 & \cdot & 0 \\ \cdot & \cdot & \cdot & \cdot & \cdot & \cdot \\ \chi_1 & \chi_2 & 0 & 0 & 0 & 0 \end{vmatrix} \cdot A \text{ and } A(0) = \begin{vmatrix} 1 & 0 & 0 & 0 & \cdot & 0 \\ 0 & 1 & 0 & 0 & \cdot & 0 \\ 0 & 0 & 1 & 0 & \cdot & 0 \\ \cdot & \cdot & \cdot & \cdot & \cdot & \cdot \\ 0 & 0 & 0 & 0 & \cdot & 1 \end{vmatrix}$$

where $$\chi_1 = \frac{\delta j}{\delta s} = 2 \cdot (RO \cdot \dot{s} - y) \cdot \dot{s} \cdot DRO$$

$$\chi_2 = \frac{\delta j}{\delta e} = 2 \cdot (RO \cdot \dot{s} - y) \cdot Vm \cdot RO$$

8. The method claimed in claim 7 of locating a vehicle on a track, wherein said derivative $\dot{e}(\hat{S}0)$ of said relative measured speed error is considered to be zero in said observation window $T_o$ and said relative speed error e($\hat{S}1$) and said corrected abscissa $\hat{S}1$ of said observation window $T_o$ respectively corresponding to e($\hat{S}0$) and $\hat{S}0$ of said observation window $T_o$ in the next calculation iteration are calculated from the following equations:

$$\begin{vmatrix} \dot{s}(\hat{S}_1) \\ \dot{e}(\hat{S}_1) \end{vmatrix} = \begin{vmatrix} (1 + e(\hat{S}_0)) \cdot V_m(t_1) \\ 0 \end{vmatrix} - k \cdot G^T \cdot (G \cdot G^T + \alpha)^{-1} \cdot \sqrt{J}$$

in which k and $\alpha$ are variable parameters, $G = |G_1 \ G_2|$ where $$G_1 = \sum_{i=1}^{N} \chi_{1i} \cdot DT_o \text{ and } G_2 = \sum_{i=1}^{N} (\chi_{1i} \cdot V_m(t_i) + \chi_{2i}) \cdot DT_o$$

and $$J = \sum_{i=1}^{N} (\tilde{V}(t_i) \cdot RO(\tilde{s}_i) - y(t_i))^2 \cdot DT_o.$$

9. The method claimed in claim 1 of locating a vehicle on a track, used to control one or more controlled systems of the rail vehicle.

10. A system for locating a vehicle on a track employing the method claimed in claim 1, which system includes:
  measuring means providing the approximate speed of said vehicle;
  a single inertial sensor;
  a database in which a geometrical characteristic specific to said track and its spatial derivative for different curvilinear abscissae of said track are stored; and
  a computer receiving the information from said measuring means and from said sensor, said computer being connected to said database to calculate the abscissa of said vehicle on said track.

11. The system claimed in claim 10 wherein $\hat{S}i$ represents a curvilinear abscissa of said vehicle at time $t_i$ and:
  said speed Vm of said vehicle is measured at constant time intervals $DT_o$, said measurements of said speed Vm($t_i$) being effected at times $t_i$, $i \in [1,N]$ d of an observation time window $T_o$ preceding the measurement time $t_N$ at which said vehicle is to be located and being stored in a memory;
  said measurements of said inertial magnitude y($t_i$) effected on board said vehicle for said different times $t_i$ are stored in a memory; and an estimated curvilinear abscissa $\hat{S}N$ of said vehicle at the time $t_N$ is calculated by successive iteration, each new measurement time $t_N$ generating a new calculation iteration for which said observation window $T_o$ is shifted by an amount $DT_o$ so that the starting point i=0 of the new observation window $T_o$ coincides with the abscissa of the measurement point i=1 of said observation window $T_o$ of the preceding iteration, said estimated curvilinear abscissa $\tilde{S}N$ being calculated using the equation:

$$\tilde{s}_N = \hat{s}_0 + \sum_{i=1}^{i=N} \tilde{V}_i * DT_o, \text{ with } \tilde{V}_i = (1 + e(\hat{s}_0)) * Vm(t_i)$$

in which $\tilde{V}i$ is the corrected speed of said vehicle at each time $t_i$ of said observation window $T_o$, e($\hat{S}0$) is the relative speed error and $\hat{S}0$ is the corrected curvilinear abscissa of the starting point of said observation window $T_o$, e($\hat{S}0$) and $\hat{S}0$ being obtained in the preceding iteration by a convergent algorithm based on a non-linear observer from measurements of said speed Vm($t_i$), said single inertial magnitude y($t_i$) at each time $t_i$ and said geometrical characteristic RO($\tilde{S}i$) and its spatial derivative DRO($\tilde{S}i$) at the level of the curvilinear abscissa $\tilde{S}i$ estimated using the equation $$\tilde{s}_i = \hat{s}_0 + \sum_{n=1}^{i} \tilde{V}_n * DT_o.$$

12. The system claimed in claim 10, wherein said database contains triplets obtained by measuring said inertial magnitude y($t_j$) at different abscissae $s_j$ during a previous journey of a vehicle along said track under operating conditions guaranteeing a precise knowledge of the data of said triplets.

13. The system claimed in claim 12, wherein for any estimated abscissa $\tilde{S}i$ of said track said values of said geometrical characteristic RO($\tilde{S}i$) and said spatial derivative DRO($\tilde{S}i$) are calculated by interpolation between two triplets stored in said database.

14. The system claimed in claim 10, wherein said inertial sensor is a yaw rate gyro.

15. The system claimed in claim 10, wherein said inertial sensor is a roll rate gyro.

16. The method claimed in claim 11, wherein said relative measured speed error e($\hat{S}1$) and said corrected abscissa $\hat{S}1$ are calculated in each observation window $T_o$ from the following sliding horizon state observer equations:

$$\begin{vmatrix} \dot{s} \\ \dot{e} \\ \dot{f} \\ \cdot \\ \dot{j} \end{vmatrix} = \begin{vmatrix} (1+e) \cdot Vm \\ f \\ g \\ \cdot \\ \| RO \cdot \dot{s} - y \|^2 \end{vmatrix} - k \cdot G^T \cdot (G \cdot G^T + \alpha)^{-1} \cdot \sqrt{J}$$

in which $\dot{e}, \dot{f}, \dot{g} \ldots$ represent the successive derivatives of said relative speed error e, k and $\alpha$ are parameters, and G is the gradient of the criterion J as a function of the state of said system which is given by the solution A of the following differential matrix equation:

$$A = \begin{vmatrix} 0 & Vm & 0 & 0 & \cdot & 0 \\ 0 & 0 & 1 & 0 & \cdot & 0 \\ 0 & 0 & 0 & 1 & \cdot & 0 \\ \cdot & \cdot & \cdot & \cdot & \cdot & \cdot \\ \chi_1 & \chi_2 & 0 & 0 & 0 & 0 \end{vmatrix} \cdot A \text{ and } A(0) = \begin{vmatrix} 1 & 0 & 0 & 0 & \cdot & 0 \\ 0 & 1 & 0 & 0 & \cdot & 0 \\ 0 & 0 & 1 & 0 & \cdot & 0 \\ \cdot & \cdot & \cdot & \cdot & \cdot & \cdot \\ 0 & 0 & 0 & 0 & \cdot & 1 \end{vmatrix}$$

where $$\chi_1 = \frac{\delta J}{\delta s} = 2 \cdot (RO \cdot \dot{s} - y) \cdot \dot{s} \cdot DRO$$

$$\chi_2 = \frac{\delta J}{\delta e} = 2 \cdot (RO \cdot \dot{s} - y) \cdot Vm \cdot RO.$$

17. The system claimed in claim 16, wherein said derivative $\dot{e}(\hat{S}0)$ of said relative measured speed error is considered to be zero in said observation window $T_o$ and said relative speed error $e(\hat{S}1)$ and said corrected abscissa $\hat{S}1$ of said observation window $T_o$ respectively corresponding to $e(\hat{S}0)$ and $\hat{S}0$ of said observation window $T_o$ in the next calculation iteration are calculated from the following equations:

$$\begin{vmatrix} \dot{s}(\hat{s}_1) \\ \dot{e}(\hat{s}_1) \end{vmatrix} = \begin{vmatrix} (1 + e(\hat{s}_0)) \cdot V_m(t_1) \\ 0 \end{vmatrix} - k \cdot G^T \cdot (G \cdot G^T + \alpha)^{-1} \cdot \sqrt{J}$$

in which k and $\alpha$ are variable parameters, $G = |G_1 \; G_2|$ where $$G_1 = \sum_{i=1}^{N} \chi_{1i} \cdot DT_o \text{ and } G_2 = \sum_{i=1}^{N} (\chi_{1i} \cdot V_m(t_i) + \chi_{2i}) \cdot DT_o$$

and $$J = \sum_{i=1}^{N} \left( \tilde{V}(t_i) \cdot RO(\tilde{s}_i) - y(t_i) \right)^2 \cdot DT_o.$$

18. The system claimed in claim 10, used to control one or more controlled systems of the rail vehicle.

* * * * *